United States Patent
Hu et al.

(10) Patent No.: US 11,228,472 B2
(45) Date of Patent: Jan. 18, 2022

(54) PROCESSING DEVICE FOR A NETWORK ACCESS NODE FOR GENERATING PHASE COMPENSATED MODULATION SYMBOLS

(71) Applicant: Huawei Technologies Co., Ltd., Shenzhen (CN)

(72) Inventors: Wenquan Hu, Lund (SE); Bengt Lindoff, Kista (SE); Jingxin Wei, Beijing (CN); Neng Wang, Lund (SE); Qian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/882,131

(22) Filed: May 22, 2020

(65) Prior Publication Data

US 2020/0287768 A1    Sep. 10, 2020

Related U.S. Application Data

(63) Continuation of application No. PCT/EP2018/064756, filed on Jun. 5, 2018.

(30) Foreign Application Priority Data

Nov. 24, 2017   (EP) .................................... 17203497
Feb. 14, 2018   (EP) .................................... 18156809

(51) Int. Cl.
*H04L 27/28*   (2006.01)
*H04L 27/26*   (2006.01)
(Continued)

(52) U.S. Cl.
CPC .......... *H04L 27/2613* (2013.01); *H04L 5/001* (2013.01); *H04L 27/0014* (2013.01);
(Continued)

(58) Field of Classification Search
CPC ............... H04L 27/2647; H04L 5/0007; H04L 27/2657; H04L 27/14; H04L 27/3455; H04B 10/532; H04B 10/612
(Continued)

(56) References Cited

U.S. PATENT DOCUMENTS

2013/0070874 A1*   3/2013   Nakagawa ............... H04B 7/10
                                                              375/323
2014/0161215 A1*   6/2014   Kim ..................... H04L 27/2691
                                                              375/371
(Continued)

FOREIGN PATENT DOCUMENTS

| CN | 102333370 A | 1/2012 |
|---|---|---|
| CN | 102724149 A | 10/2012 |
| CN | 106534029 A | 3/2017 |

OTHER PUBLICATIONS

"Discussion on SS block transmission frequency locations," 3GPP TSG-RAN WG4 Meeting #85, Reno, USA, R4-1713223, XP051374677, pp. 1-3, 3rd Generation Partnership Project, Valbonne, France (Nov. 27-Dec. 1, 2017).
(Continued)

*Primary Examiner* — Khai Tran
(74) *Attorney, Agent, or Firm* — Leydig, Voit & Mayer, Ltd.

(57) ABSTRACT

The disclosure relates to performing phase compensation at a transmitter. A processing device for a network access node generates a phase compensated modulation symbol based on at least one first modulation symbol and at least on one of a frequency offset parameter and a time offset parameter. The frequency offset parameter may be determined based on an offset between a reference frequency f0 and a DC (0 Hz) frequency such that the frequency offset parameter corresponds to the reference frequency f0. Also, the reference frequency f0 can be at least partly based on the carrier of
(Continued)

up-conversion frequency used by the processing device and the reference frequency f0 can be the carrier for up-conversion frequency. The phase compensated symbol is transmitted to a receiver, such as a client device. Furthermore, the disclosure also relates to corresponding methods and a computer program.

17 Claims, 3 Drawing Sheets

(51) Int. Cl.
  *H04L 5/00* (2006.01)
  *H04L 27/00* (2006.01)
(52) U.S. Cl.
  CPC ...... *H04L 27/2607* (2013.01); *H04L 27/2657* (2013.01); *H04L 27/2675* (2013.01)
(58) Field of Classification Search
  USPC .......................................... 375/260, 295, 267
  See application file for complete search history.

(56) References Cited

U.S. PATENT DOCUMENTS

| | | | |
|---|---|---|---|
| 2015/0029962 A1 | 1/2015 | Yun et al. | |
| 2016/0099824 A1* | 4/2016 | Lorca Hernando | ... H04L 1/0048 370/330 |
| 2019/0215206 A1* | 7/2019 | Zhu | ............... H04L 27/2657 |

OTHER PUBLICATIONS

"Discussion on SS block transmission frequency locations," 3GPP TSG-RAN WG4 Meeting #84bis, Dubrovnik,Croatia, R4-1710571, XP051345391, pp. 1-2, 3rd Generation Partnership Project, Valbonne, France (Oct. 9-13, 2017).

"OFDM Baseband Signal Generation for Initial Access," 3GPP TSG RAN WG1#91, Reno, USA, R1-1721497, XP051364014, pp. 1-3, 3rd Generation Partnership Project, Valbonne, France (Nov. 27-Dec. 1, 2017).

"3rd Generation Partnership Project; Technical Specification Group Radio Access Network; NR; Physical channels and modulation (Release 15)," 3GPP TS 38.211 V1.2.0, pp. 1-59, 3rd Generation Partnership Project, Valbonne, France (Nov. 2017).

"Part 11: Wireless LAN Medium Access Control (MAC) and Physical Layer (PHY) Specifications," IEEE Standard for Information Technology—Telecommunications and information exchange between systems Local and metropolitan area networks—Specific Requirements, IEEE Std 802.11—2016 (Revision of IEEE Std 802.11-2012), total 3534 pages, IEEE Computer Society (2016).

"Remaining details on sync signals," 3GPP TSG RAN WG1#91, Reno, USA, R1-1720272, total 6 pages, 3rd Generation Partnership Project, Valbonne, France (Nov. 27-Dec. 1, 2017).

"3rd Generation Partnership Project;Technical Specification Group Radio Access Network;NR;Physical channels and modulation(Release 15)," 3GPP TS 38.211 V1.1.1, total 59 pages, 3rd Generation Partnership Project, Valbonne, France (Oct. 2017).

* cited by examiner

PROCESSING DEVICE FOR A NETWORK ACCESS NODE FOR GENERATING PHASE COMPENSATED MODULATION SYMBOLS

CROSS-REFERENCE TO RELATED APPLICATIONS

This application is a continuation of International Application No. PCT/EP2018/064756, filed on Jun. 5, 2018, which claims priority to European Application No. EP 17203497.7, filed on Nov. 24, 2017, and European Application No. EP 18156809.8, filed on Feb. 14, 2018. All of the aforementioned patent applications are hereby incorporated by reference in their entireties.

TECHNICAL FIELD

The disclosure relates to a processing device for a network access node for generating phase compensated modulation symbols. Furthermore, the disclosure also relates to corresponding methods and a computer program.

BACKGROUND

The 5G wireless communication system, also called new radio (NR), is currently being standardized. NR is targeting radio spectrum from below 1 GHz up to and above 60 GHz. To allow for such diverse radio environments not only different system bandwidths will be supported, but also different numerologies, such as different subcarrier-spacings (SCS).

When a user equipment (UE) is switched on in a wireless communication system an initial cell search is performed to find a cell to connect to. During the initial cell search the UE will search for synchronization signal blocks (SSBs) by scanning potential carrier frequencies. In NR, the system bandwidth may be up to 100-200 MHz, compared to 20 MHz in Long Term Evolution (LTE). Furthermore, there may be multiple SSBs in the system bandwidth of a NR base station.

SUMMARY

An objective of embodiments of the disclosure is to provide a solution which mitigates or solves the drawbacks and problems of conventional solutions.

The above and further objectives are solved by the subject matter of the independent claims. Further advantageous embodiments of the disclosure can be found in the dependent claims.

According to a first aspect of the disclosure, the above mentioned and other objectives are achieved with a processing device for a network access node for generating phase compensated modulation symbols, the processing device being configured to
- obtain at least a (e.g., one) first modulation symbol on a first Orthogonal Frequency Division Modulation, OFDM, sub-carrier;
- obtain at least one of a frequency offset parameter and a time offset parameter; and
- generate a phase compensated modulation symbol on the first OFDM sub-carrier based on the obtained at least one first modulation symbol and at least on one of the frequency offset and time offset parameter.

An advantage of the processing device according to the first aspect is that the center frequency of the network access node can be separated from the center frequency of the client device, and the introduced phase shift due to different center frequencies are phase compensated without any further processing needed in the client device. Thereby, a simplified and robust solution is therefore provided. Furthermore, the processing in the transmitter can be simplified with the benefit of reducing computing resources since the present solution makes it possible to conduct phase compensation before resource element mapping in the baseband.

In an implementation form of a processing device according to the first aspect, the processing device is further configured to
- determine the frequency offset parameter based on an offset between a reference frequency f0 and a DC (0 Hz) frequency such that the frequency offset parameter corresponds to the reference frequency f0.

The direct current frequency has zero Hz.

An advantage with this implementation form is that the phase compensation performed in the network access node can be made independent of the center frequency of the client device, and thereby simplified and robust OFDM signal generation is provided.

In an implementation form of a processing device according to the first aspect, the reference frequency f0 is at least partly based on the carrier of up-conversion frequency used by the processing device.

An advantage with this implementation form is that the phase compensation performed in the network access node can be made simple by using the knowledge the network access node has about its own center frequency, and thereby simplified and robust OFDM signal generation is provided.

In an implementation form of a processing device according to the first aspect, the reference frequency f0 is the carrier for up-conversion frequency.

An advantage with this implementation form is that the phase compensation performed in the network access node can be made simple by using the knowledge the network access node has about its own center frequency, and thereby simplified and robust OFDM signal generation is provided.

In an implementation form of a processing device according to the first aspect, the processing device is further configured to
- generate the phase compensated modulation symbol so that it is calculable by $$\mathrm{Re}\{s_l(t) \cdot e^{j2\pi f_0(t-t_{start,l}-N_{CP,l}T_c)}\}, \text{ where } t_{start,l} \leq t < t_{start,l} + (N_u+N_{CP,l})T_c \text{ and}$$

$s_l(t)$ is a baseband signal based on the first modulation symbol, $f_0$ is the reference frequency f0, $t_{start,l}$ is the start time of the lth symbol, $N_{CP,l}$ is the length of the cyclic prefix in samples, $N_u$ is the length of the OFDM symbol without cyclic prefix in samples, $T_c$ is the sampling period as a time unit.

An advantage with this implementation form is that an explicit definition of the phase compensation is given. Hence, aligned phase compensation can be performed in the entire wireless communication system according to this explicit definition, which e.g., results in optimized performance of the wireless communication system.

In an implementation form of a processing device according to the first aspect, the processing device is further configured to
- generate the phase compensated modulation symbol so that it is calculable by $$\mathrm{Re}\left\{s_l(t) \cdot e^{j2\pi f_0\left(t-\sum_{m=0}^{l} N_{CP,m}T_c\right)}\right\},$$

where $t_{start,l} \leq t < t_{start,l} + (N_u+N_{CP,l})T_c$ and
wherein $s_l(t)$ is a baseband signal based on the first modulation symbol, $f_0$ is the reference frequency f0, $t_{start,l}$ is the start time of the lth symbol, $N_{CP,l}$ is the length of the cyclic prefix in samples, $N_u$ is the length of the OFDM symbol without cyclic prefix in samples, $T_c$ is the sampling period as a time unit.

An advantage with this implementation form is that an explicit definition of the phase compensation is given. Hence, aligned phase compensation can be performed in the entire wireless communication system according to this explicit definition, which e.g., results in optimized performance of the wireless communication system.

In an implementation form of a processing device according to the first aspect, the processing device is further configured to
generate the phase compensated modulation symbol so that it is calculable by $$\mathrm{Re}\{s_l(t) \cdot e^{j2\pi f_0(t-(N_u+N_{CP,l})T_c)}\}, \text{ where } 0 \le t < (N_u+N_{CP,l})T_c$$

and
wherein $s_l(t)$ is a baseband signal based on the first modulation symbol, $f_0$ is the reference frequency f0, $N_{CP,l}$ is the length of the cyclic prefix in samples, $N_u$ is the length of the OFDM symbol without cyclic prefix in samples, $T_c$ is the sampling period as a time unit.

An advantage with this implementation form is that an explicit definition of the phase compensation is given. Hence, aligned phase compensation can be performed in the entire wireless communication system according to this explicit definition, which e.g., results in optimized performance of the wireless communication system.

In an implementation form of a processing device according to the first aspect, the processing device is further configured to
determine the frequency offset parameter based on an offset between a center frequency of a first set of OFDM sub-carriers and a center frequency of a second set of OFDM sub-carriers.

An advantage with this implementation form is that the offset is based on well defined frequencies and hence the same phase compensation principles can be used by all network access nodes. Thereby, improved performance in the wireless communication system is possible.

In an implementation form of a processing device according to the first aspect, the processing device is further configured to
perform an up conversion of the compensated modulation symbol from base band to a carrier frequency using the center frequency of the first set of OFDM sub-carriers.

In an implementation form of a processing device according to the first aspect, the second set of OFDM sub-carrier comprises the first OFDM sub-carrier and wherein the second set of OFDM sub-carriers further is a subset of the first set of OFDM sub-carriers.

In an implementation form of a processing device according to the first aspect, the first set of OFDM sub-carriers corresponds to all sub-carriers defining the system bandwidth of the network access node.

In an implementation form of a processing device according to the first aspect, the second set of OFDM sub-carriers corresponds to a first Synchronization Signal Block, SSB.

In an implementation form of a processing device according to the first aspect, the processing device is further configured to
generate the phase compensated modulation symbol further based on a symbol index for the first modulation symbol in the SSB.

An advantage with this implementation form is that aligned phase compensation is used in the entire wireless communication system thereby optimizing the performance of the wireless communication system.

In an implementation form of a processing device according to the first aspect, the processing device is further configured to
obtain a second modulation symbol in a second OFDM sub-carrier;
determine a further frequency offset parameter based on an offset between a center frequency of the first set of OFDM sub-carriers and a center frequency of a third set of OFDM sub-carriers, the third set of OFDM sub-carriers corresponding to a second SSB;
generate a further phase compensated modulation symbol on the second OFDM sub-carrier within the third set of OFDM sub-carriers based on the second modulation symbol and the further frequency offset parameter.

An advantage with this implementation form is that correct phase compensation can be performed on respective SSBs and by that respective SSB can be phase compensated separately making the detection of each SSB easier at the client device.

In an implementation form of a processing device according to the first aspect, the processing device is further configured to
generate an OFDM symbol carrying both, the phase compensated modulation symbol and the further phase compensated modulation symbol.

An advantage with this implementation form is that a single OFDM symbol can comprise both phase compensated modulation symbols and hence a simplified implementation in the network access node is possible.

In an implementation form of a processing device according to the first aspect, the processing device is further configured to
determine the time offset based on a length of a cyclic prefix of an OFDM symbol used for carrying the phase compensated modulation symbol.

An advantage with this implementation form is that the needed phase compensation is a function of the length of the cyclic prefix and hence by also taking into account the length of the cyclic prefix improved phase compensation is achieved.

In an implementation form of a processing device according to the first aspect, the OFDM symbol comprises the OFDM sub-carriers of the second set of OFDM sub-carriers.

According to a second aspect of the disclosure, the above mentioned and other objectives are achieved with a method for a processing device for a network access node, the method comprises
obtaining at least one first modulation symbol on a first OFDM sub-carrier;
obtaining at least one of a frequency offset parameter and a time offset parameter; and
generating a phase compensated modulation symbol on the first OFDM sub-carrier based on the obtained at least one first modulation symbol and at least on one of the frequency offset and time offset parameter.

The method according to the second aspect can be extended into implementation forms corresponding to the implementation forms of the processing device according to the first aspect. Hence, an implementation form of the method comprises the feature(s) of the corresponding implementation form of the processing device.

The advantages of the methods according to the second aspect are the same as those for the corresponding implementation forms of the processing device according to the first aspect.

According to a third aspect of the disclosure, the above mentioned and other objectives are achieved with a network access node comprising any processing device according to the first aspect.

The disclosure also relates to a computer program, characterized in program code, which when run by at least one processor causes said at least one processor to execute any method according to embodiments of the disclosure. Further, the disclosure also relates to a computer program product comprising a computer readable medium and said mentioned computer program, wherein said computer program is included in the computer readable medium, and comprises one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION

According to the draft specification in TR 38.211v1.1.1, the time-continuous signal $s_l^{(p,\mu)}(t)$ on antenna port p and subcarrier spacing configuration $\mu$ for orthogonal frequency division multiplexing (OFDM) symbol l in a subframe for any physical channel or physical signal except physical random access channel (PRACH) is defined by $$s_l^{(p,\mu)}(t) = \sum_{k=0}^{N_{RB}^{\mu}N_{sc}^{RB}-1} a_{k,l}^{(p,\mu)} \cdot e^{j2\pi(k+k_0-N_{RB}^{\mu}N_{sc}^{RB}/2)\Delta f(t-N_{CP,l}^{\mu}T_c)}$$

where $0 \le t < (N_u^{\mu}+N_{CP,l}^{\mu})T_c$ and $\mu$ is the subcarrier spacing configuration. Furthermore, $\alpha_{k,l}^{(p,\mu)}$ is the modulation symbol l on subcarrier k, $N_{RB}$ is the number of physical resource blocks, and $N_{SC}$ is the number of subcarriers per resource block (RB). Hence, the product $N_{RB}*N_{SC}$ corresponds to the next generation eNode B (gNB) fast Fourier transform (FFT) size. Furthermore, $\Delta f$ denotes the subcarrier spacing, $T_c$ is the chip duration and the $k_0$ is an offset parameter. The function exp(j*x) in the above expression is the complex valued exponential function and hence $s_l^{(p,\mu)}(t)$ is the complex-valued baseband representation of the transmitted signal. Modulation and up-conversion to the carrier frequency $f_0$ of the complex-valued OFDM baseband signal for antenna port p and subcarrier spacing configuration $\mu$ is given by $$Re\{s_l^{(p,\mu)}(t) \cdot e^{j2\pi f_0 t}\}.$$

The main difference of synchronization signal transmission in NR and LTE is that in NR the central subcarrier of a synchronization system block (SSB) will not be aligned with the up-conversion carrier frequency $f_0$ for a gNB. The carrier frequency $f_0$ is the center frequency of the FFT spanning the entire gNB system bandwidth (BW). Typically, the gNB system bandwidth is up to 20 MHz in LTE, while for NR the system bandwidth can be up to 100-200 MHz. Furthermore, in NR there can be multiple SSBs in the gNB system bandwidth. Moreover, the SSB in NR consists of the primary synchronization signal (PSS) and the secondary synchronization signal (SSS) as well as the physical broadcast channel (PBCH), which includes the master information block (MIB). In the MIB, information such that whether a cell is allowed for initial connection or not is found as well as information about the subframe number (SFN).

The eNB center frequency in LTE is indirectly detected using the knowledge that the PSS, SSS and PBCH always are transmitted in the central 6 RBs centered around the carrier frequency. Therefore, once a UE have determined the PSS and SSS it has also determined the center frequency of the eNB system bandwidth, and hence the center frequency used in the receiver FFT processing.

The NR PBCH does not contain much information, instead there will be a pointer to where the remaining system information (RMSI) control resource set (CORESET) can be found. From this pointer, the UE gets information about a frequency range where the UE should monitor the CORESET, i.e., time-frequency resources in a control channel where indication of RMSI information is sent. In the RMSI further system information is given including random access channel (RACH) parameters for initial connection setup, and information and/or pointer to other system information (OSI).

For SSB symbols in NR, the baseband signal at a gNB transmitter can be written as:

$$s_l(t) = \sum_{k=0}^{N_{SSB}-1} a_{k,l} \cdot e^{j2\pi(k+M-N_{SSB}/2)\Delta f(t-N_{CP,l}T_c)}, \quad \text{(Equation 1)}$$

where $0 \le t < (N_u+N_{CP,l})T_c$, l=0, 1, 2 . . . $\alpha_{k,l}$ is the modulated symbol of a SSB, and wherein the SSB occupies only part of subcarriers in the system bandwidth, herein labelled as the FFT size of the SSB, i.e., $N_{SSB}$. The parameter M is the offset in number of subcarriers between the center frequency of the gNB system bandwidth and the center frequency of the SSB bandwidth.

The relationship between the frequency offset $f_M$, the subcarrier offset M and the subcarrier spacing $\Delta f$ is given by the relation $f_M = M*\Delta f$. The lower frequency of the SSB bandwidth starts at carrier frequency according to $$f_M - \frac{N_{SSB}}{2}\Delta f = \left(M - \frac{N_{SSB}}{2}\right)\Delta f.$$

According to the current status of the NR specification, up-conversion to the carrier frequency $f_0$ of the SSB part of the baseband signal is given by $Re\{s_l(t)e^{j2\pi f_0(t+l(N_u+N_{CP,l})T_c)}\}$, $0 \le t < (N_u+N_{CP,l})T_c$, l=0, 1,2, . . . , (Equation 2).

Here the cyclic prefix lengths $N_{CP,l}T_c$, l=0, 1, 2 . . . are assumed the same in each symbol to illustrate the idea. It is however easy to write a more general form where different symbols can have different cyclic prefix lengths as illustrated in other embodiments in this document.

In initial cell search in NR, the UE will search for SSBs. In principle the UE will adapt its down-conversion frequency to a hypothetical down-conversion frequency $f_x$ and adapt its receiver bandwidth to cover the SSB signal, and down-convert the received signal and trying to detect the PSS and SSS. As long as the hypothetical down-conversion frequency $f_x$ is different from the frequency $f_0+f_M$ the UE will not detect the SSB and will scan for further potential carrier frequencies. Due to this drawback the inventors have analyzed this scenario in detail. Therefore, assuming an ideal channel, the received baseband signal after down-conversion by a receiver local oscillator at frequency $f_0+f_M$, i.e., the correct carrier frequency at the UE for detecting the SSB in an OFDM symbol without cyclic prefix (CP) length, can be expressed as $$r(t) = \sum_{k=0}^{N_{SSB}-1} a_{k,l} e^{j2\pi(k+M-N_{SSB}/2)\Delta f(t-N_{CP,l}T_c)}, \quad \text{(Equation 3)}$$

$$e^{-j2\pi M\Delta f(t+l(N_u+N_{CP,l})T_c)}$$

$$= \sum_{k=0}^{N_{SSB}-1} a_{k,l} e^{j2\pi(k-N_{SSB}/2)\Delta f(t-N_{CP,l}T_c)}$$

$$e^{-j2\pi M\Delta f(N_{CP,l}T_c+l(N_u+N_{CP,l})T_c)}$$

$$= \sum_{k=0}^{N_{SSB}-1} a_{k,l} e^{j2\pi(k-N_{SSB}/2)\Delta f(t-N_{CP,l}T_c)}$$

$$e^{-j2\pi M\Delta f(l+1)N_{CP,l}T_c}$$

where $0 \le t < (N_u + N_{CP,l})T_c$, $l = 0, 1, 2 \ldots$, where $f_M = M*\Delta f$ is an unknown subcarrier offset between the carrier frequency at the receiver and the carrier frequency at the transmitter at the initial cell search phase for the UE. Hence, upon switching on the UE and performing an initial cell search in NR, the UE will be affected by an unknown phase shift between the symbols of the SSB, where the phase shift among other things is dependent on the length of the cyclic prefix as well as the frequency offset between the gNB center carrier frequency and the SSB center frequency as can be seen from the expression in Equation 3, i.e., $$\varphi(l) = e^{-j2\pi M\Delta f(l+1)N_{CP,l}T_c},$$

where l is the symbol number. It can be noted that if M=0, i.e., no frequency offset between the SSB and the gNB offset, then $\varphi(l)=1$. To avoid the unknown phase shift between the symbols of the SSB, it has been realized that a signal should be derived where the central frequency at the transmitter side is aligned with the central frequency at the receiver side which is $$f_1 = f_0 + f_M.$$

In a similar case as in LTE, the central subcarrier of SSB will be aligned with the up-conversion carrier frequency which is the same as the receiver local oscillator frequency. In this case, the desired baseband signal is as follow $$s_l \%(t) = \sum_{k=0}^{N_{SSB}-1} a_{k,l} \cdot e^{j2\pi(k-N_{SSB}/2)\Delta f(t-N_{CP,l}T_c)}, \quad \text{(Equation 4)}$$

$$0 \le t < (N_u + N_{CP,l})T_c, l = 0, 1, 2 \ldots.$$

According to the inventors, when comparing Equation 3 and Equation 4, due to the nonaligned local oscillator carrier frequencies at the transmitter side and the receiver side and the phase contiguous carrier waveform, there will be a per symbol phase shift which corresponds to the term $$e^{-j2\pi M\Delta f(l+1)N_{CP,l}T_c}$$

where $f_M = M\Delta f = f_1 - f_0$ in Equation (3) is equal to the frequency offset under the current assumption in NR. This per symbol phase shift among OFDM symbols is unknown for the UE at the initial cell search phase and would involve extra complexity at the receiver.

From the above discussion and analysis the inventors have found that a separate IFFT processing of SSB and other downlink (DL) symbols would consume more computing resources at the network side, and hence there is a need for more efficient implementation methods for such phase compensation in the network access node, such as a gNB. Therefore, a processing device for a network access node is herein introduced which solves or mitigates the drawbacks of conventional solutions.

Figure 1:
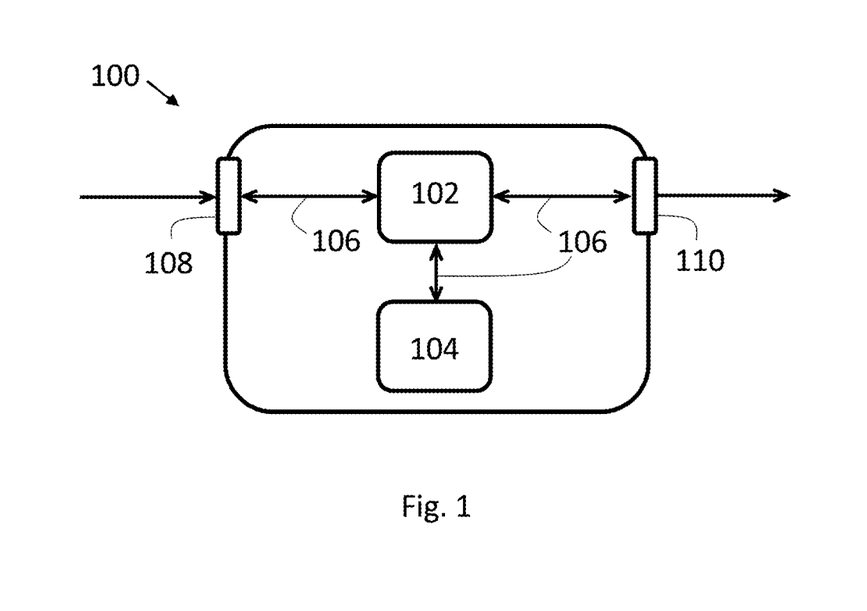
FIG. 1 shows a processing device according to an embodiment of the disclosure.

FIG. 1 shows a processing device 100 according to an embodiment of the disclosure. In the embodiment shown in FIG. 1, the processing device 100 comprises at least one processor core 102, which can be coupled to an internal or external memory 104 with coupling/communication means 106 known in the art. The processing device 100 may further comprise a plurality of processor cores 102. The memory 104 may store program code that, when being executed, causes the processor core(s) 102 of the processing device 100 to performing the functions and actions described herein. The processing device 100 further comprises input means 108 and output means 110, which are both coupled to the processor core 102 with coupling/communication means 106 known in the art.

The processor core 102 may be a dedicated processor core for executing the method/algorithm according to the disclosure only. However, the processor core 102 of the processing device 100 may in embodiments be shared with another network device, such as a network access node, and perform additional processing. That the processing device 100 is configured to perform certain functions or actions can in this disclosure be understood to mean that the processing device 100 comprises suitable means, such as e.g., the processor core 102, configured to perform said functions or actions.

According to embodiments of the disclosure the processing device 100 is configured to obtain at least one first modulation symbol on a first OFDM sub-carrier and obtain at least one of a frequency offset parameter and a time offset parameter. The processing device 100 is further configured to generate a phase compensated modulation symbol on the first OFDM sub-carrier based on the obtained at least one first modulation symbol and at least on one of the frequency offset and time offset parameter.

The processing device 100 can hence generate one or more phase compensated modulation symbols, i.e., for each obtained modulation symbol using at least one of a frequency offset parameter and a time offset parameter associated with each obtained modulation symbol.

Figure 2:
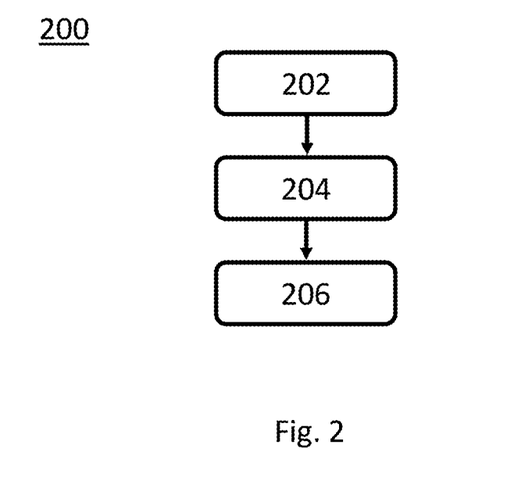
FIG. 2 shows a method according to an embodiment of the disclosure.

FIG. 2 shows a flow chart of a corresponding method 200 which may be executed in a processing device 100, such as the one shown in FIG. 1. The method 200 comprises obtaining 202 at least one first modulation symbol on a first OFDM sub-carrier and obtaining 204 at least one of a frequency offset parameter and a time offset parameter. The method 200 further comprises generating 206 a phase compensated modulation symbol on the first OFDM sub-carrier based on the obtained at least one first modulation symbol and at least on one of the frequency offset and time offset parameter.

Figure 3:
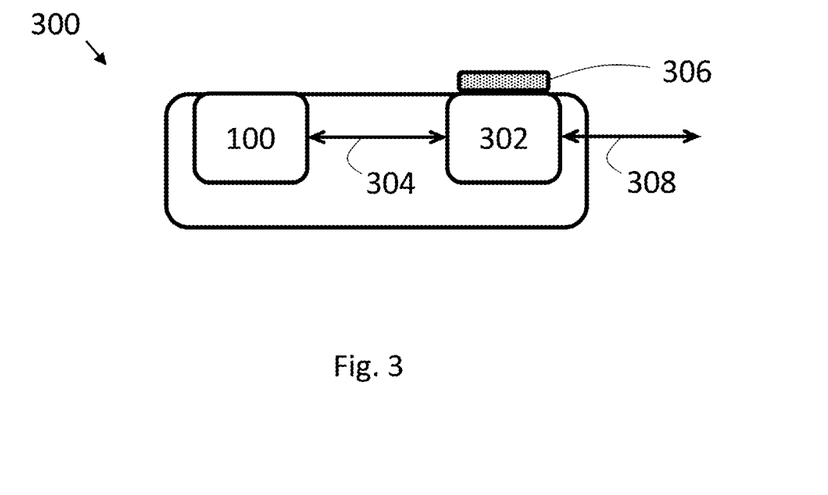
FIG. 3 shows a network access node comprising a processing device according to an embodiment of the disclosure.

The processing device 100 may be comprised in a network access node, such as e.g., the network access node 300 shown in FIG. 3. The processing device 100 may hence be a functional module, e.g., a communication module such as a baseband processor, configured to operate in the network access node 300. In the embodiment shown in FIG. 3, the network access node 300 comprises the processing device 100 and a transceiver/modem 302. The processing device 100 is coupled to the transceiver 302 by communication means 304 known in the art. The network access node 300 may be configured for both wireless and wired communications in wireless and wired communication systems, respectively. The wireless communication capability is provided with an antenna or antenna array 306 coupled to the transceiver 302, while the wired communication capability is provided with a wired communication interface 308 coupled to the transceiver 302.

Figure 4:
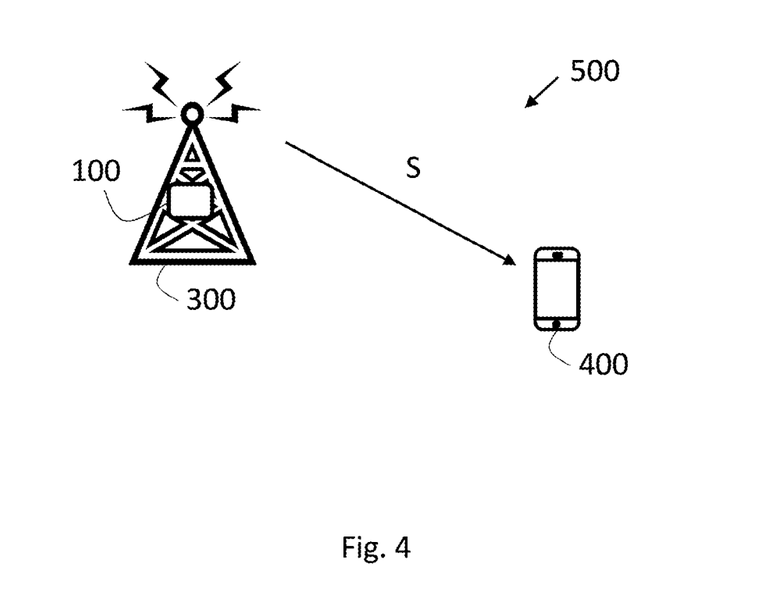
FIG. 4 illustrates interaction between a network access node and a client device in a wireless communication system.

Furthermore, FIG. 4 shows a network access node 300, comprising a processing device 100, interacting with a client device 400 in a wireless communication system 500. In FIG. 4 the network access node 300 transmits a signal S comprising one or more OFDM symbols to the client device 400. The signal S transmitted to the client device 400 is processed by the processing device 100 according to embodiments of the disclosure.

Figure 5:
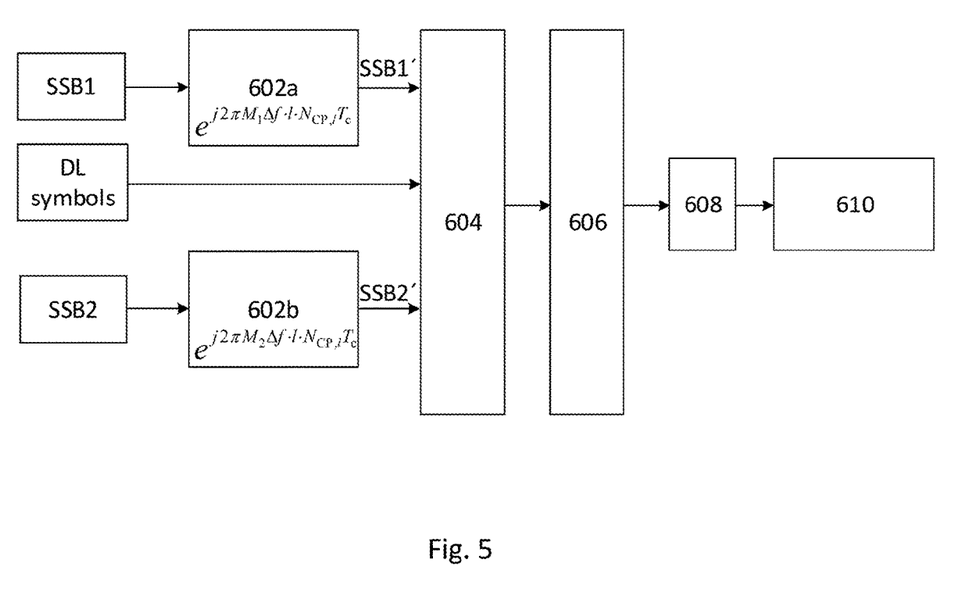
FIG. 5 shows a block diagram according to an embodiment of the disclosure.

Moreover, with reference to the analysis in respect of Equation 3, the inventors have also found that if phase compensation is performed for a specific SSB symbol in the baseband before data mapping/resource element mapping, then joint IFFT processing can be executed for all SSB symbols and other downlink (DL) data symbols. FIG. 5 shows a block diagram illustrating such embodiments where per symbol phase compensations for each SSB symbol is performed before IFFT processing in the baseband. The processing performed in the block diagram shown in FIG. 5 can be executed in the processing device 100, e.g., as a software implementation, but can also be implemented and/or being part of a transmitter of e.g., a network access node 300. Hence, processing performed in the block diagram can also be implemented in hardware or in a combination of hardware and software.

With reference to FIG. 5, for different SSB symbols arranged with different frequency offsets arranged around the center frequency different respective phase compensations can be applied. In the non-limiting example in FIG. 5 two different SSB symbols, i.e., a first SSB denoted SSB1 and a second SSB denoted SSB2, in the base band are feed to its respective phase compensation block 602a and 602b. The embodiment in FIG. 5 makes it possible to generate an OFDM symbol carrying both phase compensated modulation symbols SSB1 and SSB2. However, obviously more than two SSBs can be processed.

The phase compensation for a specific SSB according to the embodiment in FIG. 5 depends on the frequency shift between the central frequency of the SSB and the central frequency of the system bandwidth. In this respect, the phase compensation for a specific SSB can therefore depend on the symbol index of the specific SSB, e.g., l=0, 1, 2, 3, since the symbol index in this context reflects the frequency shift. Also the Cyclic Prefix (CP) length is used in the phase compensation according to embodiments of the disclosure. In other words, the time offset is further determined based on the length of the cyclic prefix of the OFDM symbol carrying the phase compensated modulation symbols. Hence, the phase compensation is performed by using the phase compensation term $$e^{j2\pi M\Delta f \cdot l \cdot N_{CP} T_c},$$

which means that the value of each phase compensation applied in respective phase compensation block 602a; 602b depends on the symbol index for a symbol in an SSB (i.e., l), offset (for the center frequency of the SSB) in number of sub-carrier spacings from the center frequency of the gNB system bandwidth (i.e., $M*\Delta f$), and the length of the cyclic prefix (i.e., $N_{CP}*T_C$). It is to be noted that the inventors have also realized that any phase compensation which is linear to the term $$e^{j2\pi M\Delta f \cdot l \cdot N_{CP} T_c}$$

can be applied in the phase compensation blocks 602a; 602b. Hence, phase compensation coefficients linear to said term are covered by embodiments of the disclosure.

The respective phase compensation blocks 602a and 602b in FIG. 5 outputs the phase compensated versions of SSB1 and SSB2 denoted as SSB1' and SSB2', respectively, to a common data mapping block 604.

The data mapping block 604 is configured to map the phase compensated SSBs, i.e., SSB1' and SSB2' in this case, to its respective resource elements or sub-carriers. Also, other downlink data symbols are mapped onto its resource elements in the data mapping block 604. This is illustrated with the block denoted "DL symbols" in FIG. 5.

The IFFT block 606 in FIG. 5 is configured to receive the mapped phase compensated symbols from the data mapping block 604 and perform inverse FFT and hence transforms frequency domain symbols into digital time domain signals; in this case to digital OFDM time domain signals. Further, the IFFT block 606 also adds cyclic prefix to the digital OFDM time domain signals prior to digital-to-analog conversion. The IFFT block 606 can be a N-point IFFT block where N denotes the size of the IFFT, for example N=4096.

The digital-to-analog converter (DAC) 608 receives the digital OFDM time domain signals including the cyclic prefix from the IFFT block 606. The DAC 608 is further configured to convert the digital OFDM time domain signal to an analog OFDM time domain analog signal which is sent to the up-conversion block 610. Mentioned up-conversion block 610 is configured to up-convert the phase compensated base band analog OFDM time domain signal to radio frequency in the radio frequency chain before transmission via an antenna (not shown in FIG. 5) to one or more client devices.

The central frequency of the system bandwidth is also in this embodiment the reference frequency f0 for up-conversion from the baseband to the carrier frequency. Therefore, the reference frequency f0 is the carrier frequency for up-conversion frequency in this case. In embodiments of the disclosure, a second set of OFDM sub-carriers comprises a first OFDM sub-carrier and the second set of OFDM sub-carriers is further a subset of a first set of OFDM sub-carriers. The first set of OFDM sub-carriers corresponds to all sub-carriers defining the system bandwidth of the network access node 300, e.g., the gNB system bandwidth in NR, and the second set of OFDM sub-carriers corresponds to a SSB.

At the client device 400, due to the processing according to block diagram in FIG. 5, the derived baseband signal for a specific received SSB can be expressed as $$r(t) = \sum_{k=0}^{N_{SSB}-1} a_{k,l} e^{j2\pi M\Delta f \cdot l N_{CP,l} T_c} \quad \text{(Equation 5)}$$

$$e^{j2\pi(k-N_{SSB}/2)\Delta f(t-N_{CP,l}T_c)} e^{-j2\pi M\Delta f(l+1)N_{CP,l}T_c}$$

$$= \sum_{k=0}^{N_{SSB}-1} a_{k,l} e^{j2\pi(k-N_{SSB}/2)\Delta f(t-N_{CP,l}T_c)} e^{-j2\pi M\Delta f N_{CP,l}T_c}$$

where $0 \leq t < (N_u + N_{CP,l})T_c$, $l = 0, 1, 2 \ldots$.

Comparing Equations 5 and 3, the per symbol phase shifts among OFDM symbols due to non-aligned central frequencies between the network access node 300 and the client device 400 are eliminated through the phase compensation on the frequency domain symbols performed in the processing device 100 according to the disclosure. Hence, embodiments of the disclosure simplify the transmitter processing with the benefit of consuming less computing resources.

In embodiments of the disclosure the frequency offset parameter is determined based on an offset between a reference frequency f0 and the direct current (DC) frequency having 0 Hz. Hence, the frequency offset labelled $\Delta f_0$ is in this case a frequency offset between f0 and DC, hence $\Delta f_0 = f0-0$.

In this respect, the transmitting node, e.g., the network access node 300, can perform a partial phase shift compensation. To be precise, the transmitting node performs the part of the phase shift compensation related to the reference frequency f0 which implies that the reference frequency f0 is at least partly based on the carrier of the up-conversion frequency. Hence, in this case the frequency offset $\Delta f_0$ is used for determining the phase shift between OFDM symbols. An intention of this embodiment is that the receiving side, e.g., a client device 400, performs corresponding partial phase compensation. To be precise, the receiving side performs the part of the phase compensation related to the center frequency of the SSB f1.

The equations below therefore show examples of the mentioned partial compensations on the respective transmitter side and receiver side according to embodiments of the disclosure. It is assumed in the following disclosure that the transmitter, corresponds to a network access node 300, interacting with a receiver, corresponding to a client device 400, in a wireless communication system 500. However, this assumption is a non-limiting example of applications of the disclosure.

In an embodiment, the phase compensated modulation symbol is generated so that it is calculable by the formula according to Equation 6, i.e., $$\text{Re}\{s_l(t) \cdot e^{j2\pi f_0(t-t_{start,l}-N_{CP,l}T_c)}\}, \text{ where } t_{start,l} \leq t < t_{start,l} + (N_u+N_{CP,l})T_c \quad \text{(Equation 6),}$$

wherein $s_l(t)$ is a baseband signal based on a first modulation symbol (e.g., a SSB symbol), $f_0$ is the reference frequency f0, $t_{start,l}$ is the start time of the lth symbol, $N_{CP,l}$ is the length of the cyclic prefix in samples, $N_u$ is the length of the OFDM symbol without cyclic prefix in samples, $T_c$ is the sampling period as a time unit.

Furthermore, $s_l(t)$ is the baseband signal which has a formula as Equation 7 below if the variable t is changed to $t_{start,l} \leq t < t_{start,l} + (N_u+N_{CP,l})T_c$ which means that Equation 1 and 7 represent the same signal. For the SSB transmission in NR, the baseband signal at the network access node 300 can be given by:

$$s_l(t) = \sum_{k=0}^{N_{SSB}-1} a_{k,l} \cdot e^{j2\pi(k+M-N_{SSB}/2)\Delta f(t-t_{start,l}-N_{CP,l}T_c)} \quad \text{(Equation 7)}$$

where $t_{start,l} \leq t < t_{start,l} + (N_u + N_{CP,l})T_c$.

Herein $\alpha_{k,l}$ is the modulated symbol of SSB and SSB occupies only part of subcarriers in the system bandwidth. For example, the upper SSB may start from subcarrier $$f_M - \frac{N_{SSB}}{2}\Delta f = \left(M - \frac{N_{SSB}}{2}\right)\Delta f.$$

The baseband signal after down-conversion at the client device 400 assuming an ideal channel will be $$r(t) = s_l(t) \cdot e^{j2\pi f_0(t-t_{start,l}-N_{CP,l}T_c)} e^{j2\pi f_1 t} \quad \text{(Equation 8)}$$

$$= s_l(t) e^{j2\pi(f_0-f_1)(t-t_{start,l}-N_{CP,l}T_c)} e^{-j2\pi f_1(t_{start,l}+N_{CP,l}T_c)}$$

$$= \sum_{k=0}^{N_{SSB}-1} a_{k,l} \cdot e^{j2\pi(k-N_{SSB}/2)\Delta f(t-t_{start,l}-N_{CP,l}T_c)}$$

$$e^{-j2\pi f_1(t_{start,l}+N_{CP,l}T_c)}$$

where $t_{start,l} \leq t < t_{start,l} + (N_u + N_{CP,l})T_c$.

In this way, after a per symbol phase compensation using the term $$e^{j2\pi f_1(t_{start,l}+N_{CP,l}T_c)}$$

at the client device 400, the client device 400 can be simplified to have a similar receiver as in LTE. In another words, the l+1:th OFDM symbol has an extra phase of according to the term $$e^{j2\pi f_1(N_u+N_{CP,l+1})T_c}$$

compared with the l:th OFDM symbol which can be compensated by the client device 400.

In this embodiment, f0 is a common reference frequency that may for instance be the transmitter up-conversion frequency but may in other embodiments be another reference frequency. For instance, the reference frequency may be f0+K, where K may be a known frequency offset. K can also be known to the client device 400, e.g., defined by a pre-defined rule such as given by a 3GPP standard. K can also be configured by the network access node 300 which in such case implies that the value of K is indicated by the network access node 300 to the client device 400 in suitable control signaling. Further, K can be a fixed frequency (e.g., K=5 kHz) or be a function of the currently used or a default sub-carrier spacing (e.g., K=15, 30, 60, 120, 240 kHz for instance) or multiples of the currently used sub-carrier-spacing.

Also, other common reference frequencies f0 can be used and are hence covered by embodiments of the disclosure. Therefore, in this embodiment the phase compensated modulation symbol is generated so that it is calculable by the formula according to Equation 9, i.e., $$\mathrm{Re}\{s_l(t) \cdot e^{j2\pi f_0(t - t_{start,l} - N_{CP,l}T_c)}\}, \text{ where } t_{start,l} \leq t < t_{start,l} + (N_u + N_{CP,l})T_c \quad \text{(Equation 9)},$$

wherein $s_l(t)$ is a baseband signal based on the first modulation symbol (e.g., a SSB symbol), $f_0$ is the reference frequency f0, $N_{CP,l}$ is the length of the cyclic prefix in samples, $N_u$ is the length of the OFDM symbol without cyclic prefix in samples, $T_c$ is the sampling period as a time unit.

In another embodiment phase compensated modulation symbol is generated so that it is calculable by the formula according to Equation 10, i.e., $$Re\left\{s_l(t) \cdot e^{j2\pi f_0\left(t - \sum_{m=0}^{l} N_{CP,m}T_c\right)}\right\}, \quad \text{(Equation 10)}$$

where $t_{start,l} \leq t < t_{start,l} + (N_u + N_{CP,l})T_c$, wherein $s_l(t)$ is a baseband signal based on the first modulation symbol (e.g., a SSB symbol), $f_0$ is the reference frequency f0, $t_{start,l}$ is the start time of the lth symbol, $N_{CP,l}$ is the length of the cyclic prefix in samples, $N_u$ is the length of the OFDM symbol without cyclic prefix in samples, $T_c$ is the sampling period as a time unit.

Herein $s_l(t)$ is the baseband signal which has a formula as in Equation 7 if the variable t is changed to $$t_{start,l} \leq t < t_{start,l} + (N_u + N_{CP,l})T_c.$$

In this case, the client device 400 performs a phase compensation according to the following equations wherein the baseband signal after down conversion will be:

$$r(t) = s_l(t) \cdot e^{j2\pi f_0\left(t - \sum_{m=0}^{l} N_{CP,m}T_c\right)} e^{-j2\pi f_1 t} \quad \text{(Equation 11)}$$

$$= s_l(t) e^{j2\pi(f_0 - f_1)(t - t_{start,l} - N_{CP,l}T_c)} e^{-j2\pi f_1 \sum_{m=0}^{l} N_{CP,m}T_c}$$

$$= \sum_{k=0}^{N_{SSB}-1} a_{k,l} \cdot e^{j2\pi(k - N_{SSB}/2)\Delta f(t - t_{start,l} - N_{CP,l}T_c)}$$

$$e^{-j2\pi f_1 \sum_{m=0}^{l} N_{CP,m}T_c}$$

where $t_{start,l} \leq t < t_{start,l} + (N_u + N_{CP,l})T_c$.

In this way, after a per symbol phase compensation with the use of the expression $$e^{j2\pi f_1 \sum_{m=0}^{l} N_{CP,m}T_c}$$

at the client device 400 the receiver in the client device 400 can be simplified and hence the client device 400 for NR to have a similar receiver as that in LTE.

In yet another embodiment the phase compensation at the network access node 300 would instead be as described in the following. Assume that the baseband signal generation at the network access node 300, the time-continuous signal $s_l(t)$ for OFDM symbol with index l in a subframe for a physical channel, such as the SSB, is defined by:

$$s_l(t) = \sum_{k=0}^{N_{grid}^{size,\mu} N_{sc}^{RB}-1} a_{k,l} \cdot e^{j2\pi(k + k_0 - N_{grid}^{size} N_{sc}^{RB}/2)\Delta f(t - N_{CP,l}T_c)}, \quad \text{(Equation 12)}$$

where $0 \leq t < (N_u + N_{CP,l})T_c$.

Here Equation 12 is in principle the same as Equation 1. The up-conversion formula for all channels/signals is given by $$\mathrm{Re}\{s_l(t) \cdot e^{j2\pi f_0(t - (N_u + N_{CP,l})T_c)}\}, \text{ where } 0 \leq t < (N_u + N_{CP,l})T_c \quad \text{(Equation 13)}.$$

This is actually a partial phase compensation at the network access node 300 with a phase compensation by $$e^{-j2\pi f_0(N_u + N_{CP,l})T_c}$$

for each OFDM symbol.

Following the above formula for up-conversion, there is a per symbol phase adjustment according to term $(N_u + N_{CP,l})T_c$. So, at the client device 400, for the l:th symbol, l+1 times of phase adjustment have been done since the 0th symbol, and the received signal after downlink conversion can be written as:

$$\hat{r}_l(t + t_{start,l}) = \quad \text{(Equation 14)}$$

$$\left(s_l(t) \cdot e^{j2\pi f_0\left(t + t_{start,l} - \sum_{n=0}^{l}(N_u + N_{CP,n})T_c\right)}\right) \cdot e^{-j2\pi f_1(t + t_{start,l})}$$

$$t_{start,l} = \sum_{m=0}^{l-1}(N_u + N_{CP,m}T_c) =$$

$$\left(s_l(t) \cdot e^{j2\pi f_0(t - (N_u + N_{CP,l})T_c)}\right) \cdot e^{-j2\pi f_1(t + T_{start,l})} =$$

$$\left(s_l(t) \cdot e^{j2\pi(f_0 - f_1)(t - N_{CP,l}T_c)}\right) \cdot e^{-j2\pi f_1(N_{CP,l}T_c + t_{start,l})}$$

$$e^{-j2\pi f_0(N_u T_c)},$$

where $0 \leq t < (N_u + N_{CP,l})T_c$, $l = 0, 1, \ldots$.

Then the client device 400 can perform phase compensation using the center frequency of the SSB $f_1$ by $$e^{j2\pi f_1(t_{start,l} + N_{CP,l}T_c)}$$

at digital baseband according to the formula:

$$\hat{r}_l(t + t_{start,l}) \cdot e^{j2\pi f_1(t_{start,l} + N_{CP,l}T_c)} = \quad \text{(Equation 15)}$$

$$\left(s_l(t) \cdot e^{j2\pi(f_0 - f_1)(t - N_{CP,l}T_c)}\right) \cdot e^{-j2\pi f_1(N_{CP,l}T_c + t_{start,l})}$$

$$e^{-j2\pi f_0(N_u T_c)} \cdot e^{j2\pi f_1(t_{start,l} + N_{CP,l}T_c)} =$$

$$s_l(t) \cdot e^{j2\pi(f_0 - f_1)(t - N_{CP,l}T_c)} \cdot e^{-j2\pi f_0(N_u T_c)},$$

where $0 \leq t < (N_u + N_{CP,l})T_{c,l} = 0, 1, \ldots$.

The second term, i.e., $$e^{j2\pi(f_0 - f_1)(t - N_{CP,l}T_c)},$$

in Equation 15 will vanish when expanding the baseband signal term, and the last term, i.e., $$e^{-j2\pi f_0(N_u T_c)},$$

in Equation 15 is a constant. In this way, a phase shift/rotation of the received symbols are compensated at the client device 400.

As can be noted in the above embodiments covered by the disclosure, the phase compensation made in the network access node 300 is based on the reference frequency f0, which can be seen as a frequency offset between the reference frequency f0 and the DC frequency with 0 Hz.

The client device 400 herein, may be denoted as a user device, a user equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 300 herein may also be denoted as a radio network access node, an access network access node, an access point, or a base station, e.g., a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g., macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 400 and the network access node 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

The processor(s) of the processing device 100 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended claims.

Definitions of Acronyms & Glossaries

| | |
|---|---|
| eNB | E-UTRAN NodeB |
| NR | New Radio |
| PSS | Primary Synchronization Signal |
| SSS | Secondary Synchronization Signal |
| PBCH | Primary Broadcast Channel |
| UE | User Equipment |
| SSB | Synchronization Signal Block |
| PDSCH | Physical Downlink Shared data Channel |
| DRX | Discontinuous Reception Mode |
| gNB | Next Generation eNode B |
| RX | Receiver |
| BW | Bandwidth |
| CSI-RS | Channel State Information Reference Symbols |
| RSRP | Received Signal Reference Power |
| BLER | Block Error Rate |
| SINR | Signal to Interference and Noise Ratio |
| CRS | Common Reference Symbols |
| BPL | Beam pair link |

What is claimed is:

1. A device for generating phase-compensated modulation symbols, the device comprising processing circuitry configured to:
   obtain a first modulation symbol on a first orthogonal frequency division modulation (OFDM) sub-carrier;
   obtain at least one parameter, wherein the at least one parameter comprises a frequency offset parameter, wherein obtaining the at least one parameter comprises determining the frequency offset parameter based on an offset between a reference frequency f0 and a direct current (DC) frequency having 0 Hz, such that the frequency offset parameter corresponds to the reference frequency f0; and
   generate a phase-compensated modulation symbol on the first OFDM sub-carrier based on the first modulation symbol and the at least one parameter.

2. The device of claim 1, wherein the reference frequency f0 is at least partly based on a carrier of up-conversion frequency used by the device.

3. The device of claim 2, wherein the reference frequency f0 is the carrier of up-conversion frequency.

4. The device of claim 1, wherein the processing circuitry is further configured to:
   generate the phase-compensated modulation symbol based on:

$\text{Re}\{s_l(t) \cdot e^{j2\pi f_0(t - t_{start,l} - N_{CP,l} T_c)}\}$, wherein $t_{start,l} \leq t < t_{start,l} + (N_u + N_{CP,l})T_c$, and
   wherein $s_l(t)$ is a baseband signal based on the first modulation symbol, $f_0$ is the reference frequency f0, $t_{start,l}$ is a start time of a lth symbol, $N_{CP,l}$ is a length of a cyclic prefix in samples, $N_u$ is a length of an OFDM symbol without cyclic prefix in samples, and $T_c$ is a sampling period as a time unit.

5. The device of claim 1, wherein the processing circuitry is further configured to:
   generate the phase-compensated modulation symbol based on:

$$Re\{s_l(t) \cdot e^{j2\pi f_0(t-\sum_{m=0}^{l} N_{CP,m}T_c)}\},$$

wherein $t_{start,l} \leq t < t_{start,l} + (N_u + N_{CP,l})T_c$, and
  wherein $s_l(t)$ is a baseband signal based on the first modulation symbol, $f_0$ is the reference frequency f0, $t_{start,l}$ is a start time of a lth symbol, $N_{CP,l}$ is a length of a cyclic prefix in samples, $N_u$ is a length of an OFDM symbol without cyclic prefix in samples, and $T_c$ is a sampling period as a time unit.

6. The device of claim 1, wherein the processing circuitry is further configured to:
  generate the phase-compensated modulation symbol based on:

$$Re\{s_l(t) \cdot e^{j2\pi f_0(t-(N_u+N_{CP,l})T_c)}\},$$

wherein $0 \leq t < (N_u+N_{CP,l})T_c$, and
  wherein $s_l(t)$ is a baseband signal based on the first modulation symbol, $f_0$ is the reference frequency f0, $N_{CP,l}$ is a length of a cyclic prefix in samples, $N_u$ is a length of an OFDM symbol without cyclic prefix in samples, and $T_c$ is a sampling period as a time unit.

7. A device for generating phase-compensated modulation symbols, the device comprising processing circuitry configured to:
  obtain a first modulation symbol on a first orthogonal frequency division modulation (OFDM) sub-carrier;
  obtain at least one parameter, wherein the at least one parameter comprises a frequency offset parameter, wherein obtaining the at least one parameter comprises determining the frequency offset parameter based on an offset between a center frequency of a first set of OFDM sub-carriers and a center frequency of a second set of OFDM sub-carriers; and
  generate a phase-compensated modulation symbol on the first OFDM sub-carrier based on the first modulation symbol and the at least one parameter.

8. The device of claim 7, wherein the processing circuitry is further configured to:
  perform an up-conversion of the phase-compensated modulation symbol from a base band to a carrier frequency using the center frequency of the first set of OFDM sub-carriers.

9. The device of claim 7, wherein the second set of OFDM sub-carriers comprises the first OFDM sub-carrier, and wherein the second set of OFDM sub-carriers further is a subset of the first set of OFDM sub-carriers.

10. The device of claim 9, wherein the first set of OFDM sub-carriers corresponds to all sub-carriers defining a system bandwidth of a network access node.

11. The device of claim 7, wherein the second set of OFDM sub-carriers corresponds to a first synchronization signal block (SSB).

12. The device of claim 11, wherein generating the phase-compensated modulation symbol is further based on a symbol index for the first modulation symbol in the SSB.

13. The device of claim 11, wherein the processing circuitry is further configured to:
  obtain a second modulation symbol in a second OFDM sub-carrier;
  determine a further frequency offset parameter based on an offset between a center frequency of the first set of OFDM sub-carriers and a center frequency of a third set of OFDM sub-carriers, the third set of OFDM sub-carriers corresponding to a second SSB; and
  generate a further phase-compensated modulation symbol on the second OFDM sub-carrier within the third set of OFDM sub-carriers based on the second modulation symbol and the further frequency offset parameter.

14. The device of claim 13, wherein the processing circuitry is further configured to:
  generate an OFDM symbol carrying both the phase-compensated modulation symbol and the further phase-compensated modulation symbol.

15. A device for generating phase-compensated modulation symbols, the device comprising processing circuitry configured to:
  obtain a first modulation symbol on a first orthogonal frequency division modulation (OFDM) sub-carrier;
  obtain at least one parameter, wherein the at least one parameter comprises a time offset parameter, wherein obtaining the at least one parameter comprises determining the time offset parameter based on a length of a cyclic prefix of an OFDM symbol used for carrying the phase-compensated modulation symbol; and
  generate a phase-compensated modulation symbol on the first OFDM sub-carrier based on the first modulation symbol and the at least one parameter.

16. A method for generating phase-compensated modulation symbols, the method comprising:
  obtaining a first modulation symbol on a first OFDM (orthogonal frequency division modulation) sub-carrier;
  obtaining at least one parameter, wherein the at least one parameter comprises a frequency offset parameter, wherein obtaining the at least one parameter comprises determining the frequency offset parameter based on an offset between a reference frequency f0 and a direct current (DC) frequency having 0 Hz, such that the frequency offset parameter corresponds to the reference frequency f0; and
  generating a phase-compensated modulation symbol on the first OFDM sub-carrier based on the first modulation symbol and the at least one parameter.

17. A non-transitory computer-readable medium storing a computer program with a program code that, when executed by processing circuitry, causes a device to generate phase-compensated modulation symbols by performing steps of:
  obtaining a first modulation symbol on a first orthogonal frequency division modulation (OFDM) sub-carrier;
  obtaining at least one parameter, wherein the at least one parameter comprises a frequency offset parameter, wherein obtaining the at least one parameter comprises determining the frequency offset parameter based on an offset between a reference frequency f0 and a direct current (DC) frequency having 0 Hz, such that the frequency offset parameter corresponds to the reference frequency f0; and
  generating a phase-compensated modulation symbol on the first OFDM sub-carrier based on the first modulation symbol and the at least one parameter.

* * * * *

UNITED STATES PATENT AND TRADEMARK OFFICE
CERTIFICATE OF CORRECTION

PATENT NO. : 11,228,472 B2
APPLICATION NO. : 16/882131
DATED : January 18, 2022
INVENTOR(S) : Hu et al.

It is certified that error appears in the above-identified patent and that said Letters Patent is hereby corrected as shown below:

In the Claims

Claim 16: Column 18, Lines 31-32: "a first OFDM (orthogonal frequency division modulation)" should read -- a first orthogonal frequency division modulation (OFDM) --.

Signed and Sealed this
Thirty-first Day of May, 2022

Katherine Kelly Vidal
*Director of the United States Patent and Trademark Office*